(12) United States Patent
Hosoya (10) Patent No.: US 6,224,170 B1
(45) Date of Patent: May 1, 2001

(54) HYDRAULIC CONTROL VALVE DEVICE

(75) Inventor: Yukio Hosoya, Hamakita (JP)

(73) Assignee: Nisshinbo Industries Inc., Tokyo (JP)

( * ) Notice: Subject to any disclaimer, the term of this patent is extended or adjusted under 35 U.S.C. 154(b) by 0 days.

(21) Appl. No.: 09/140,419

(22) Filed: Aug. 26, 1998

(30) Foreign Application Priority Data

Aug. 27, 1997 (JP) .................................................. 9-246128

(51) Int. Cl.⁷ .............................. B60T 8/36; F16K 31/06
(52) U.S. Cl. .................................... 303/119.2; 251/129.15
(58) Field of Search .................... 300/119.2; 137/596.17; 251/129.15

(56) References Cited

U.S. PATENT DOCUMENTS

| | | | |
|---|---|---|---|
| 5,203,617 | * 4/1993 | Wilde | 303/119.2 |
| 5,673,979 | * 10/1997 | Kuromitsu et al. | 303/119.2 |
| 5,673,980 | * 10/1997 | Schwarz et al. | 303/119.2 |
| 5,704,587 | * 1/1998 | Kuromitsu et al. | 303/119.2 |

\* cited by examiner

Primary Examiner—Matthew C. Graham
(74) Attorney, Agent, or Firm—Arent Fox Kintner Plotkin & Kahn (57) ABSTRACT

A hydraulic control valve device which effectively reduces noise, vibration, and harshness (NVH) effect. A piston 38 is slidably provided in the smaller diameter portion 32b of the magnet core. A valve seat 38a is formed on the piston 38, A spring 40 is provided between the piston 36 and the bore 31, The deflection of the spring 40 absorbs the operation impact created by closing the valve mechanism of the valve member 35a and the valve seat 38a.

27 Claims, 7 Drawing Sheets

HYDRAULIC CONTROL VALVE DEVICE

BACKGROUND OF THE INVENTION

This invention relates to a hydraulic control valve device for an anti-lock braking system (ABS hereinafter) and a traction control system (TCS hereinafter). More specifically, it relates to a hydraulic control valve device which uses a wide open channel during normal braking operation and uses a throttled channel during hydraulic pressure control.

A hydraulic brake device, which prevents wheel locking by electronically controlling brake hydraulic pressure when at full braking or sudden braking, is publicly known. This type of device is well-known to create noise, vibration, harshness (NVH) such as a metal sound or vibration when the electromagnetically operated normally open valve (hydraulic control valve device hereinafter) is closed. In order to resolve NVH, there exists a method of providing an independent differential pressure switching valve at the upstream side of the hydraulic control valve device of the main hydraulic braking line.

The above-described conventional method to eliminate NVH is effective to a certain degree. Metal sound or vibration, however, could not completely be eliminated which leaves room for an improvement.

OBJECTS AND SUMMARY OF THE INVENTION

The main object of this invention is to resolve the above-identified problems. To that end, this invention provides a hydraulic control valve device which further improves the reduction of the NVH effect.

Another object of the invention is to provide a hydraulic control valve device which prevents malfunction of the device.

Another object of the invention is to provide a hydraulic control valve device which enables smooth pressure reduction with certainty when releasing the braking force.

The first aspect of invention is to provide a hydraulic control valve which comprises a sleeve fixed in a bore of a housing, an armature which is slidably installed in the sleeve including a valve stem with a valve member on a distal end thereof, a magnet core fixed in the bore of the housing together with the sleeve, the magnet core having a smaller diameter portion extending into the bore, a coil assembly operating the armature by an electromagnetic force, a piston strokably provided in the smaller diameter portion of the magnet core, a valve seat formed on an end surface of the piston facing the valve member, and a spring provided between the piston and a bottom of the bore absorbing operation impact created when the valve member contacts the valve seat.

The second aspect of invention is to provide a hydraulic control valve device as above, wherein a release channel is formed either between the piston and an inner surface of the smaller diameter portion of the magnet core or at the piston.

The third aspect of the invention is to provide a hydraulic control valve device as above, further comprising a reverse stop valve formed to prevent a flow through the release channel, the stop valve including a cylindrical protuberance formed on one of the end surface of the valve seat side of the piston or a stepped portion in the smaller diameter portion of the magnet core facing the end surface of the valve seat side of the piston, flow through the release channel being stopped by the cylindrical protuberance and the end surface of the valve seat side abutting against the cylindrical protuberance or the stepped portion in the smaller diameter portion.

The fourth aspect of the invention is to provide a hydraulic control valve device which comprises a normally open inlet valve in a main hydraulic line between a master cylinder and a wheel cylinder and a hydraulic switching valve at a wheel cylinder side of the inlet valve in the main line, wherein the switching valve controlling a channel between the master cylinder and wheel cylinder to be wide open when in a normal braking operation and a hydraulic pressure difference between the master cylinder side and wheel cylinder side switching the channel to be throttled when in a hydraulic control. The inlet valve comprises a sleeve fixed in a bore of a housing, an armature slidably installed in the sleeve including a valve stem with an inlet valve member at a distal end thereof, a magnet core fixed in the bore of the housing with the sleeve, through which the inlet valve member is inserted, the magnet core having a smaller diameter portion extending into the bore, a coil assembly electromagnetically operating the armature, an inner piston slidably provided in smaller diameter portion of the magnet core, an inlet valve seat formed on the surface of the inner piston facing the inlet valve member of the armature, and an inner spring provided between the inner piston and a bottom of the bore absorbing an impact created when closing the valve mechanism of the inlet valve member and inlet valve seat. The switching valve comprises: an outer piston which is slidably provided exterior on the smaller diameter portion of the magnet core dividing the bore into a first hydraulic chamber connected to the master cylinder and a second hydraulic chamber connected to the wheel cylinder, an outer spring pressing the outer piston toward the bottom of the bore, and a connection bore provided through the smaller diameter portion of the magnet core to connect the master cylinder side and the wheel cylinder side and defining the channel, wherein the outer piston slides along the smaller diameter portion of the magnet core in response to the hydraulic pressure difference between the master cylinder side and wheel cylinder side as occurring in the first and second hydraulic chambers, respectively, in the direction to switch the channel from being wide open to being throttled.

The fifth aspect of the invention is provide a hydraulic control valve device as above, wherein a release channel is formed either between the piston and an inner surface of the smaller diameter portion of the magnet core or at the piston; whereby hydraulic pressure of the wheel cylinder is released to the master cylinder via the release channel when the hydraulic pressure of the master cylinder falls below the predetermined amount from the hydraulic pressure of the wheel cylinder.

The sixth aspect of the invention is to provide a hydraulic control valve as above, further comprising: a reverse stop valve formed to prevent a flow through the release channel, the stop valve including a cylindrical protuberance formed on one of the end surface of the valve seat side of the piston or a stepped portion in the smaller diameter portion of the magnet core facing the end surface of the valve seat side of the piston, flow through the release channel being stopped by the cylindrical protuberance and the end surface of the valve seat side abutting against the cylindrical protuberance or the stepped portion in the smaller diameter portion.

The seventh aspect of the invent ion is to provide a hydraulic control valve device as above, further comprising: a retainer ring contacting the bottom of the bore and extending into the smaller diameter portion of the magnet core, wherein a throttle channel is formed between the retainer ring and the smaller diameter portion of the magnet core, and a main channel of the master cylinder side and the first hydraulic chamber are connected via the throttle channel.

The eighth aspect of the invention is to provide a hydraulic control valve device as above, further comprising: a holding plate formed on the retainer ring, and a sealing device inserted between an outer surface of the smaller diameter portion of the magnet core and the bore, the sealing member being held by the holding plate.

BRIEF DESCRIPTION OF DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Several embodiments of the invention are explained with reference to the following diagrams.

Figure 4:
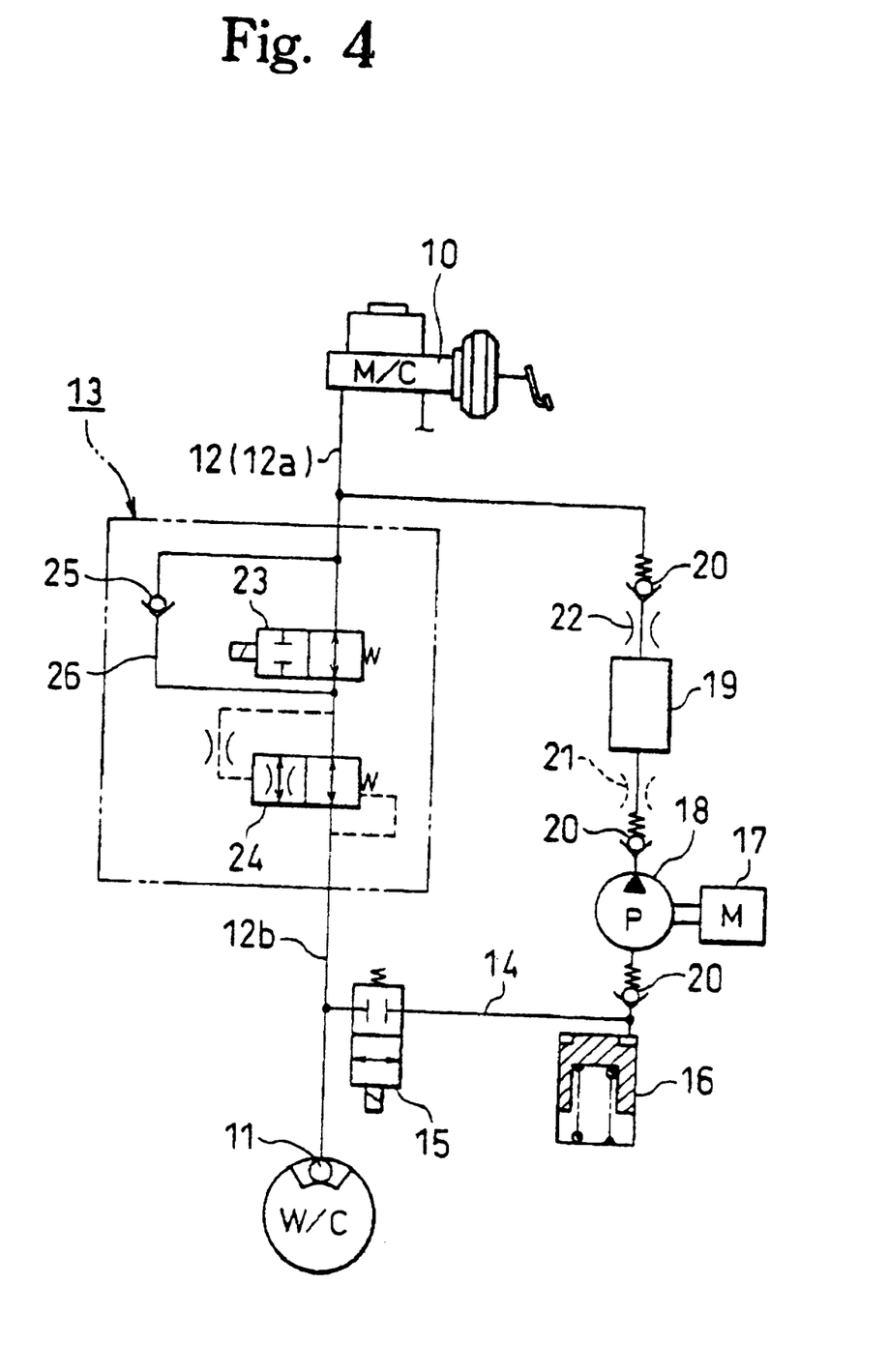
FIG. 4 is a hydraulic pressure circuit diagram showing the use of the hydraulic brake device in hydraulic braking control.

FIG. 4 is a hydraulic circuit diagram showing the hydraulic brake device of the present invention in use in an ABS equipped vehicle.

A main hydraulic fluid braking line 12 is formed between a master cylinder 10 and a wheel cylinder 11. The normally open hydraulic control valve device 13 of this invention is provided in the main line 12.

A returning line 14 is connected to the main line 12 between the wheel cylinder 11 side of the hydraulic device 13 and the master cylinder 10 side of the hydraulic device 13. That is, the hydraulic control valve device 13 is located between the two ends of the returning line 14. A normally closed outlet valve 15, an auxiliary reservoir 16, a hydraulic pump 18 operated by a motor 17, and a damping chamber 19, are arranged in the returning line 14 in series to supply hydraulic pressure to the upstream side of the hydraulic control valve device 13, i.e. to the main line 12 at the master cylinder 10 side of the hydraulic device 13, via the outlet valve 15 and the hydraulic pump 18.

A reverse stop valve 20 is provided in the returning line 14. Reduced area throttle devices 21, 22 are located in the returning line.

The hydraulic control valve device 13 of the present invention is a combination valve comprising a normally open inlet valve 23 operable by electromagnetic force and a normally open switching valve 24 operable by hydraulic pressure difference. The switching valve 24 is located at the downstream side of the inlet valve 23. The release line 26 extends from upstream and downstream of the main line 12 in which the inlet valve 23 is located.

The switching valve 24 is a normally open two-position two-port valve which operates by hydraulic pressure difference. The valve switches from an open position to a throttle position when the hydraulic pressure difference of the master cylinder 13 and the wheel cylinder 11, which is affecting the respective chambers of the valve, is more than the predetermined amount.

Embodiment 1 of the Invention

Figure 1:
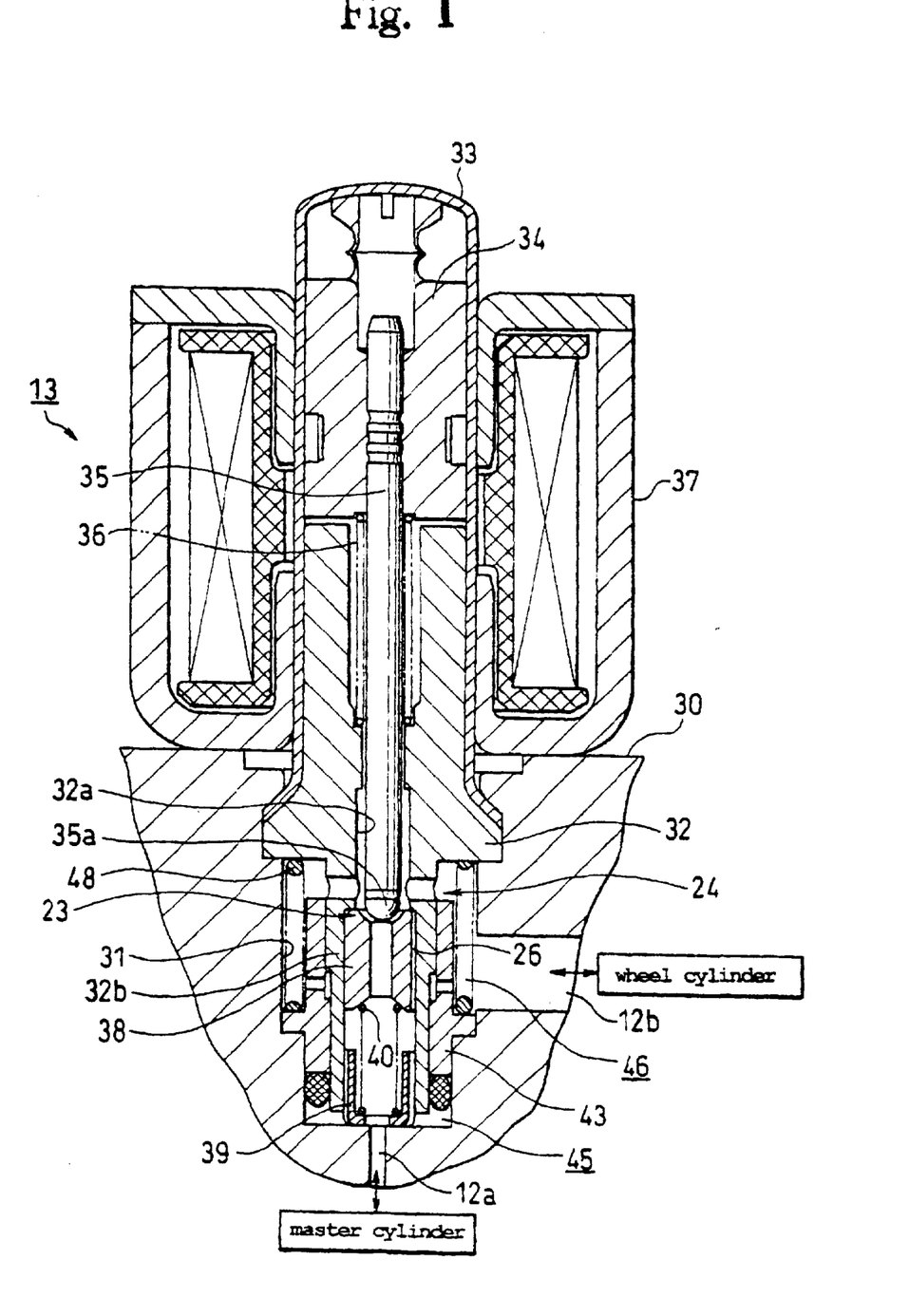
FIG. 1 is a cross-sectional view of the hydraulic control valve device according to the present invention.

FIG. 1 is a cross-sectional view of the hydraulic control valve device 13 showing a housing 30, a stepped bore 31 having a bottom and being further described below, a main line passage 12a connecting through the bore 31 to the master cylinder 10, and a main line passage 12b connecting to the wheel cylinder 11.

A magnet core 32 of a solenoid valve is installed in the bore 31 and is fixed to the housing 30. That is, the skirt portion of the dome-shaped sleeve 33 exterior to the magnet core 32 is affixed to the housing 30 by a technique such as by caulking. An armature 34 is slidably installed in the sleeve 33. A return spring 36 is installed between the armature 34 and the magnet core 32. A valve stem 35 integrated with the armature 34 are inserted in the stem hole 32a of the magnet core 32.

The donut-shaped coil assembly 37 is provided exterior to the sleeve 33.

The above described assembly is the same as in a publicly known normally open solenoid valve.

Figure 2:
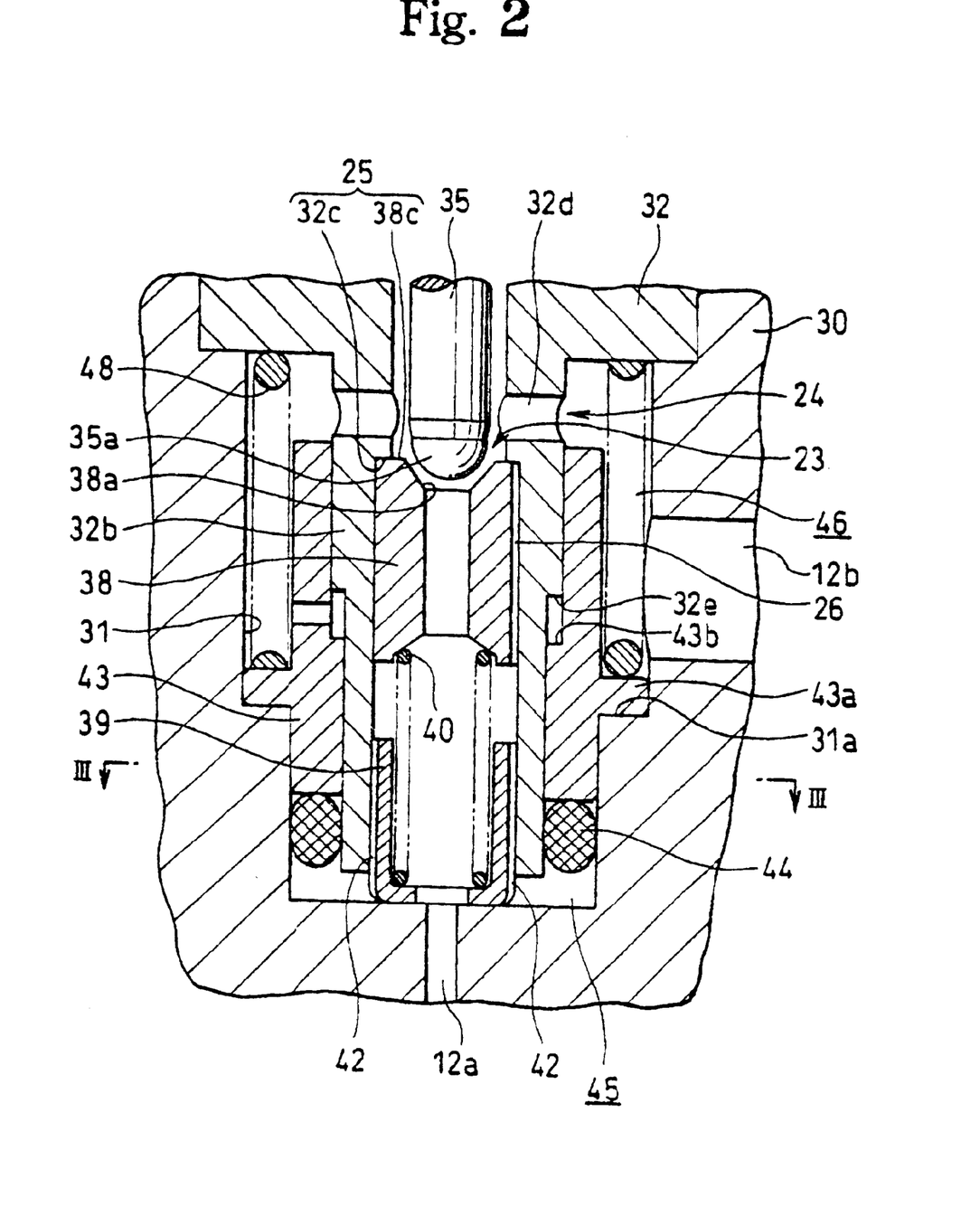
FIG. 2 is an enlarged cross-sectional view of the vital parts of the hydraulic control valve device of the invention.
Figure 3:
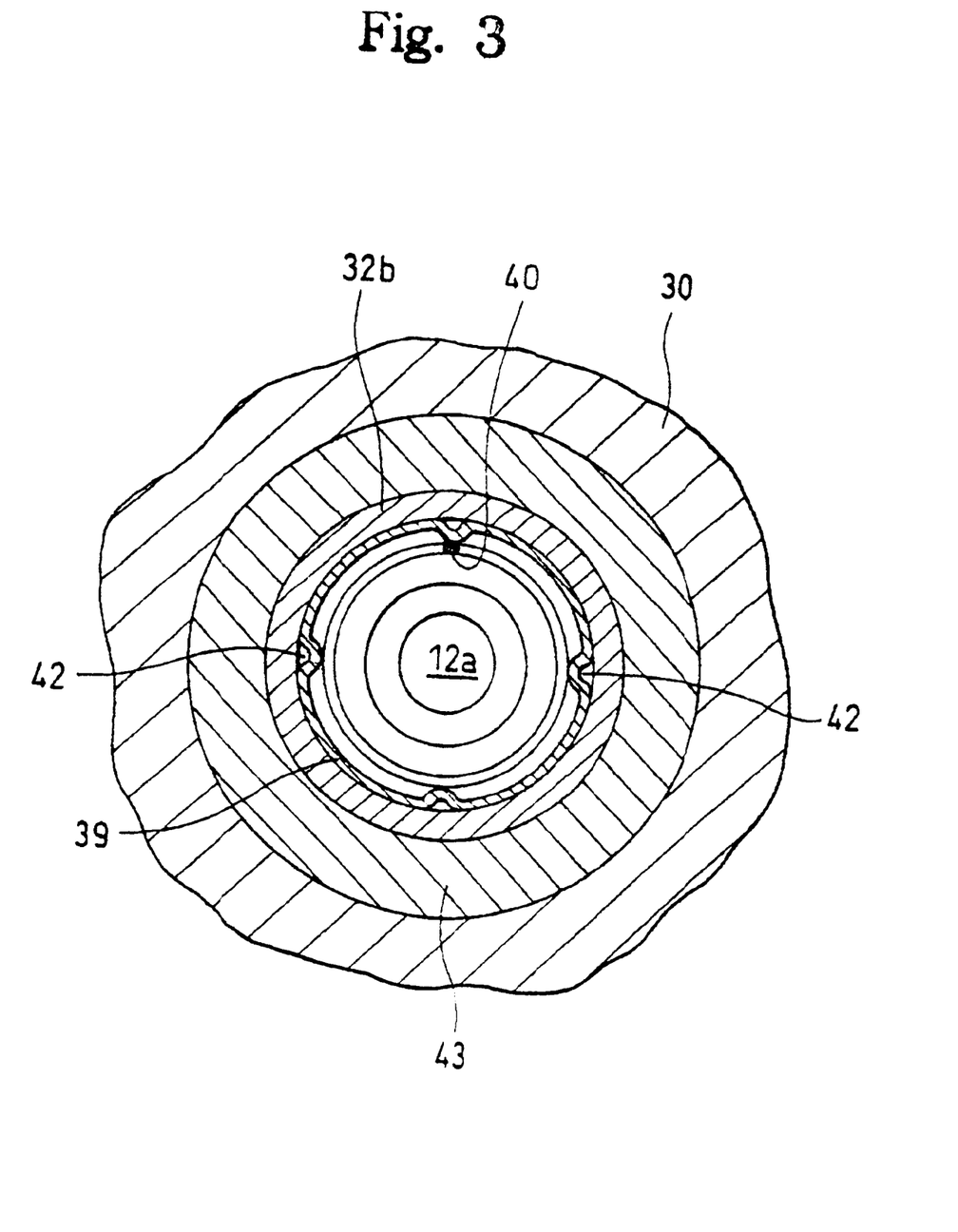
FIG. 3 is a cross-sectional view of FIG. 2 taking along line III—III.

FIG. 2 is an enlarged view of the vital part of the hydraulic control valve device 13, where the inlet valve 23 and the switching valve 24 are formed inside and outside of a smaller diameter portion 32b extending from the magnet core 32.

A tube-shaped inner piston 38 is slidably installed in the central portion of the smaller diameter portion 32b of the magnet core 32. An inner spring 40 is provided between a tube-shaped retainer ring 39 set at a distal end of the smaller diameter portion 32b and the inner piston 38. The upper end of the inner piston 38 in the diagram abuts against a stepped portion 32c of the smaller diameter portion 32b so that the sliding position and travel of the inner piston 38 may be restricted.

The normally open valve mechanism comprises an inlet valve member 35a formed at the distal end of the valve stem 35 and an inlet valve seat 38a formed at the end surface of the inner piston 38 facing the inlet valve member 35a.

The inlet valve seat 38a is formed on the inner piston 38 so that the movement of the inner piston 38 may eliminate or quiet the metal sound of the inner piston 38 caused when the inlet valve member 35a reaches and contacts the inlet valve seat 38a.

A concave cavity or slot is formed along the outer circumferential surface of the inner piston 38 defining a release channel 26 together with the inner circumferential surface of the smaller diameter portion 32b. This release channel 26 is closed or shut off when the end surface 38c of the valve seat side of the inner piston 38 abuts against the stepped portion 32c of the smaller diameter portion 32b. The release channel 26 is opened when the end surface 38c of the valve seat side of the inner piston 38 separates from the stepped portion 32c.

That is, the release channel 26 functions as a release channel which allows the flow only from the below-described second hydraulic chamber 46 (wheel cylinder) side to the main line passage 12*a* (master cylinder) side as well as a reverse stop valve 25 which prevents the flow from the master cylinder side to the wheel cylinder side.

In addition, a concave cavity may be formed at the side surface of the retainer ring 39 at the upstream side of the inlet valve 23 to form a throttle channel 42 between the retainer ring 39 and the inner circumference of the smaller diameter portion 32*b*. A concave cavity may alternatively be formed in the inner surface of the smaller diameter portion 32*b* to form the throttle channel 42 between the retainer ring 39 and the smaller diameter portion 32*b*.

The retainer ring 39 is seated on the bottom of the bore 31 to limit the throttle channel 42 between the retainer ring 39 and the smaller diameter portion 32*b* for the purpose of preventing the malfunction of the below-described outer piston 43.

A tube-shaped outer piston 43 is slidably provided exterior to the smaller diameter portion 32*b*. The smaller diameter portion 32*b* has a guide to provide a smooth slide of the outer piston 43.

Tube-shaped sealing material 44 is set on the end surface of the outer piston 43. The interior of the bore 31 closed by the outer piston 43 and the magnet core 32 is partitioned into a first hydraulic chamber 45 and a second hydraulic chamber 46. The first hydraulic chamber 45 connects to the main line passage 12*a* at the master cylinder side while the second hydraulic chamber 46 connects to the main line passage 12*b* at the wheel cylinder side. A connection bore 32*d*, formed in the radial direction in the smaller diameter portion 32*b*, connects between the main line passage 12*a* of the master cylinder side and the second hydraulic chamber 46.

An outer spring 48 is set between the magnet core 32 and a flange 43*a* of a middle portion of the outer piston 43 to push the outer piston 43 in the bore 31 toward the first chamber 45 side. The flange 43*a* of the outer piston 43 is forced to abut against a stepped portion 31*a* of the bore 31 by the spring force of the outer spring 48.

The amount of slide of the outer piston 43 in the direction compressing the outer spring 48 is restricted by a stepped portion 43*b* formed on the inner circumferential surface of the outer piston 43 hitting a stepped portion 32*e* formed on the outer circumferential surface of the smaller diameter portion 32*b*.

Normally, the outer piston 43 remains in a position so as to release or not block or throttle the connection bore 32*d* of the smaller diameter portion 32*b* due to the spring force of the outer spring 48. The outer piston 43 can slide in the direction to compress the spring 48 to switch the connection bore 32*d* from a wide open channel to a narrow, throttled channel. The normally open switching valve 24 of the present invention comprises the connection bore 32*d*, the outer piston 43, and the outer spring 48.

The operation of the hydraulic brake device and the hydraulic control valve device is explained next.

Normal Braking Operation

FIG. 4 shows the hydraulic circuit diagram during in a normal braking operation. When in a normal braking, hydraulic pressure created at the master cylinder 10 is delivered, via the inlet valve 23 and the switching valve 24 of the hydraulic control valve device 13 and via the main line 12, to the wheel cylinder 11 to brake the wheels.

The operation of the hydraulic control valve device 13 during normal braking is explained with reference to FIG. 2. The inlet valve member 35*a* separates from the inlet valve seat 38*a* of the inner piston 38 to maintain the inlet valve 23 open. The outer piston 43 is pressed by the spring force of the outer spring 48 toward the bottom of the bore 31 to release the connection bore 32*d*. By this process, the master cylinder is connected to the wheel cylinder through the wide open channel of the inlet valve 23 and the switching valve.

If no throttle channel 42 were provided, a large amount of fluid would be supplied to the first hydraulic chamber 45 and the outer piston 43 could undesireably slide in the direction that the switching valve would throttle the connection bore 32*d*. The wheel cylinder would then lack hydraulic pressure when sudden braking is applied while the switching valve 24 is open. In contrast, if the throttle channel 42 is provided, the flow to the first hydraulic chamber 45 is restricted to be a small amount. The outer piston 43 does not operate undesireably and does not cause a lack of hydraulic pressure at the wheel cylinder side upon sudden braking.

ABS Control

Operation of Electric Equipment

In FIG. 4, when the electronic control unit senses the condition of the wheel being locked during a braking operation (not shown in the diagram), it feeds electricity to the inlet valve 23, outlet valve 15, and the motor 17. The pump 18 is activated by the motor 17, and the valve mechanism including the inlet valve 23 and the outlet valve 15 functions to open and close. This repeats maintenance, reduction, and increase of the hydraulic pressure of the wheel cylinder 11 to adjust the hydraulic pressure to avoid the wheel locking.

Also, during the ABS hydraulic control, hydraulic fluid of the wheel cylinder 11 is discharged through the outlet valve 15. The discharged fluid is supplied to the main line passage 12*a* of the upstream side of the hydraulic control valve device 13 via the returning line 14.

Attenuation of NVH by the Inlet Valve during ABS control

The electromagnetic force is created when the coil assembly 37 in FIG. 1 is electrified. This electromagnetic force slides the armature 34 downward against the spring force of the return spring 36. According to the sliding of the armature 34, the inlet valve member 35*a* reaches the inlet valve seat 38*a* of the inner piston 38 as in FIG. 5, thereby closing the inlet valve 23.

Figure 5:
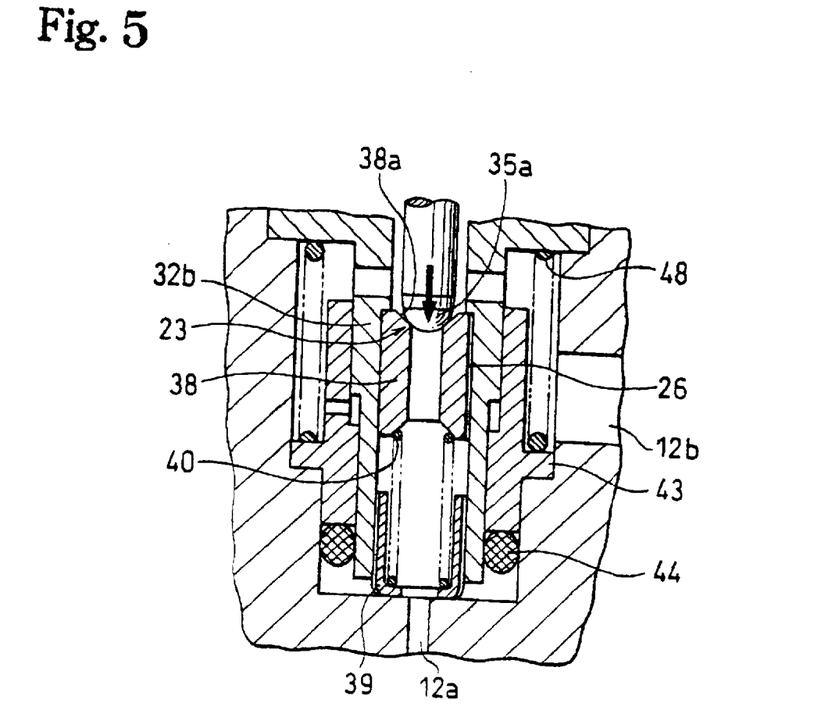
FIG. 5 is an enlarged cross-sectional view of the vital parts of the hydraulic control valve device during inlet valve operation in hydraulic control.

When the coil assembly 37 is de-electrified, the inlet valve member 35*a* separates from the inlet valve seat 38*a* by the force of the return spring 36, thereby opening the inlet valve 23.

When the inlet valve member 35*a* reaches the inlet valve seat 38*a*, the inner piston 38 slides compressing the inner spring 40. Therefore, an impact sound and water (fluid) sound of the brake fluid created by opening and closing of the inlet valve 23 will be absorbed by the contracting of the inner spring 40.

Operation of Switching Valve

Figure 6:
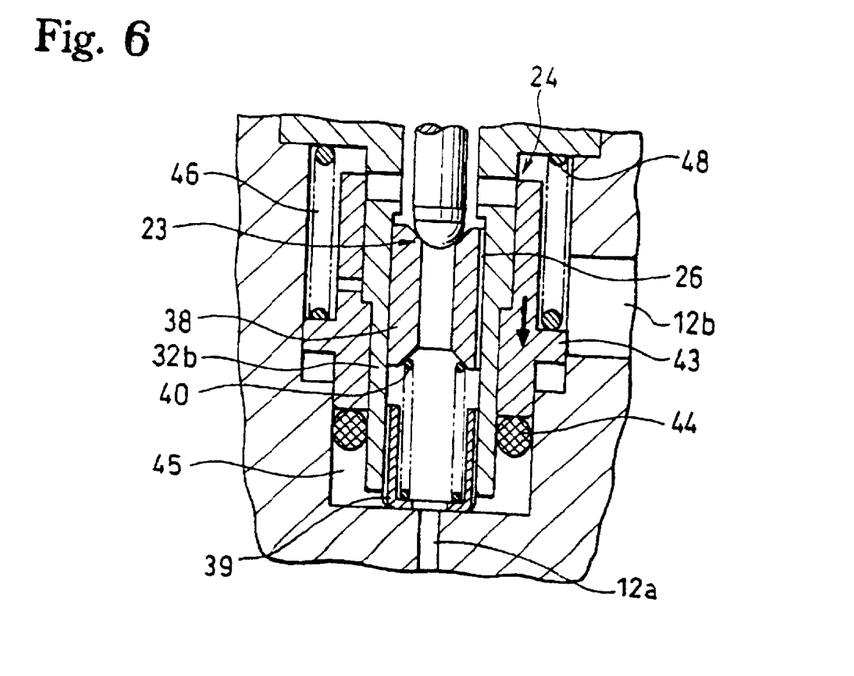
FIG. 6 is an enlarged cross-sectional view of the vital parts of the hydraulic control valve device during switching valve operation in hydraulic control.

Closing the inlet valve 23 holds the hydraulic pressure of the second hydraulic chamber 46. Then, if the outlet valve 15 is opened, the hydraulic pressure of the wheel cylinder and the second hydraulic chamber 46 is reduced. Opening the outlet valve 15 does not reduce the hydraulic pressure of the first hydraulic chamber 45; thus, a hydraulic pressure difference is created between the first hydraulic chamber 45 and the second hydraulic chamber 46. When the hydraulic pressure of the first hydraulic chamber 45 (master cylinder) becomes larger than the hydraulic pressure of the second hydraulic chamber 46 (wheel cylinder) together with the spring force of the outer spring 48, the outer piston 43 slides in the direction to compress the outer spring against the spring force of the outer spring 48, and the switching valve 24 switches the connection bore 32d from a wide open channel to a throttled channel.

Release Operation (FIG. 6)

After ending of the ABS hydraulic control, the hydraulic pressure of the master cylinder side is released, and the hydraulic pressure of the wheel cylinder is released via the above-described release channel 26 when the hydraulic pressure of the master cylinder falls below the predetermined amount of pressure relative to the hydraulic pressure of the wheel cylinder. Pressure for releasing to the master cylinder is determined according to the spring force of the inner spring 40.

Embodiment 2 of the Invention

Another embodiment of the invention is explained next. In this embodiment, the parts identical to those in the previous embodiment use the identical reference signs, and the explanation of those is omitted.

Figure 7:
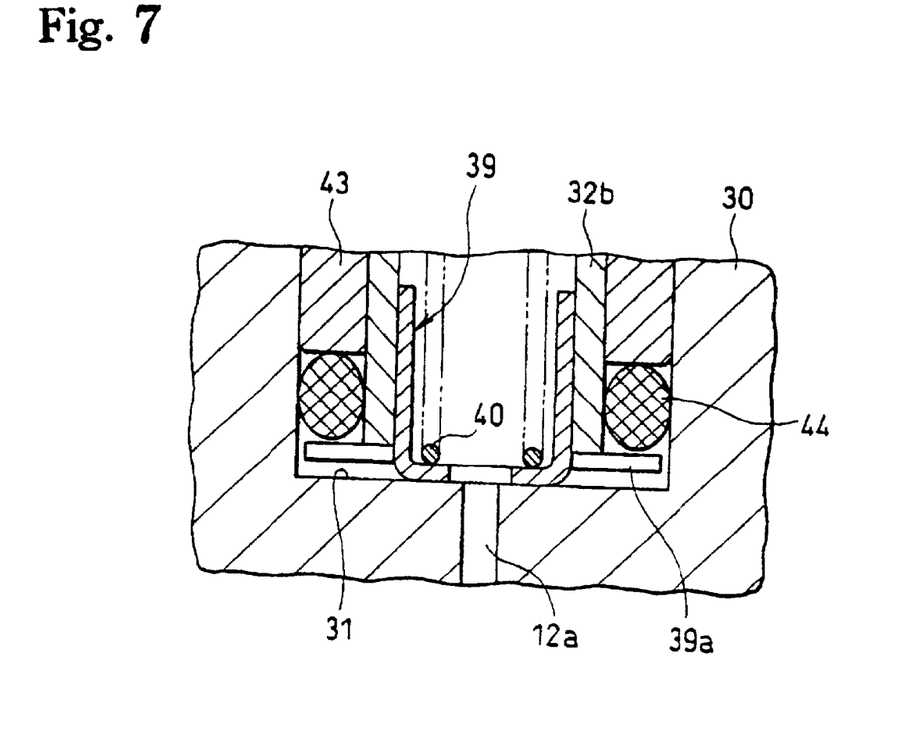
FIG. 7 is a nlarged cross-sectional view of the vital parts of another embodiment with an improved retainer ring.
Figure 8:
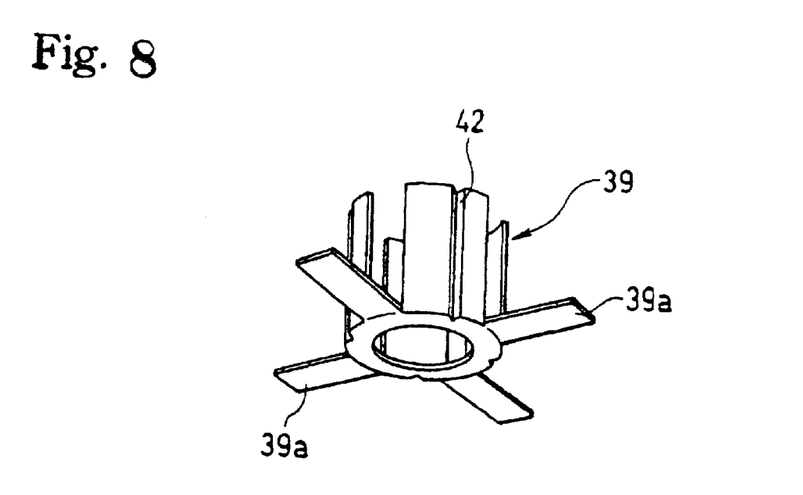
FIG. 8 is a perspective view of the retainer ring.

FIG. 7 and FIG. 8 explain a second embodiment with a holding mechanism of the sealing material 44. In this embodiment, the side surface of the retainer ring 39 is cut and is bent to form a single or a plural number of horizontal holding pieces 39a. The holding pieces 39a contact the end of the smaller diameter portion 32b of the magnet core and hold the sealing material in the bore 31. As described in Embodiment 1, the retainer ring 39 has at least one concave cavity to form the throttle channel 42 on its circumferential surface.

Embodiment 3 of the Invention

In Embodiment 1, the release channel 26 is formed between the inner piston 38 and the smaller diameter portion 32b of the magnet core 32 by forming a cavity or slot along the outer circumferential surface of the inner piston 38. However, the connection bore may be vertically formed in the inner piston 38 to be used as the release channel 26.

Embodiment 4 of the Invention

In the above embodiments, the combination valve, including a normally open switching valve operable by hydraulic pressure difference, is used for the hydraulic control valve device 13. However, the hydraulic control valve device 13 may function by the inlet valve 23 without the switching valve 24.

Embodiment 5 of the Invention

Figure 9:
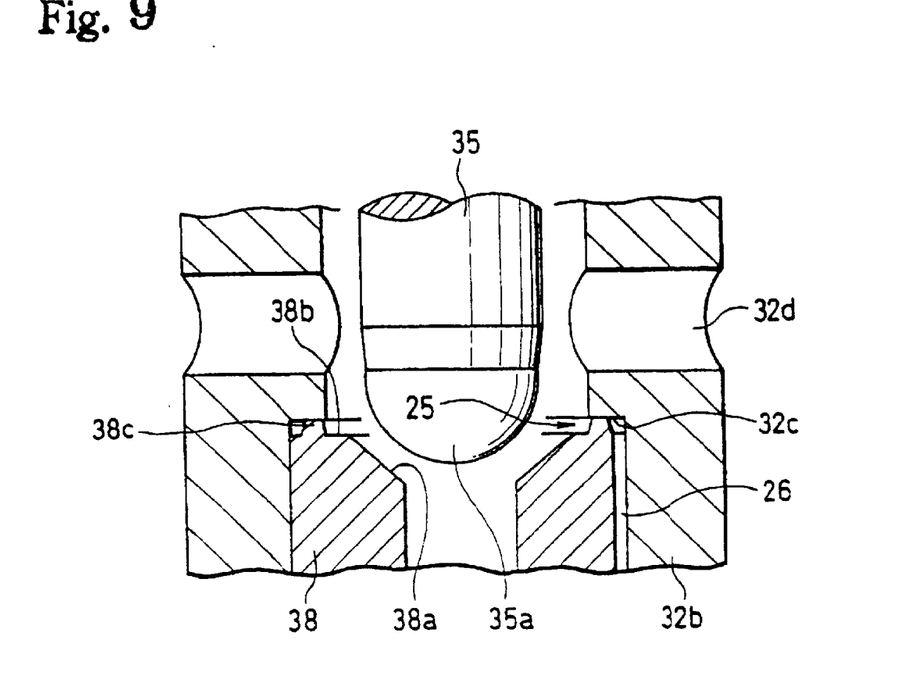
FIG. 9 is an enlarged view of the reverse stop valve relating to another embodiment of the present invention with a cylindrical protuberance at the end surface at the valve seat side of the inner piston.
Figure 10:
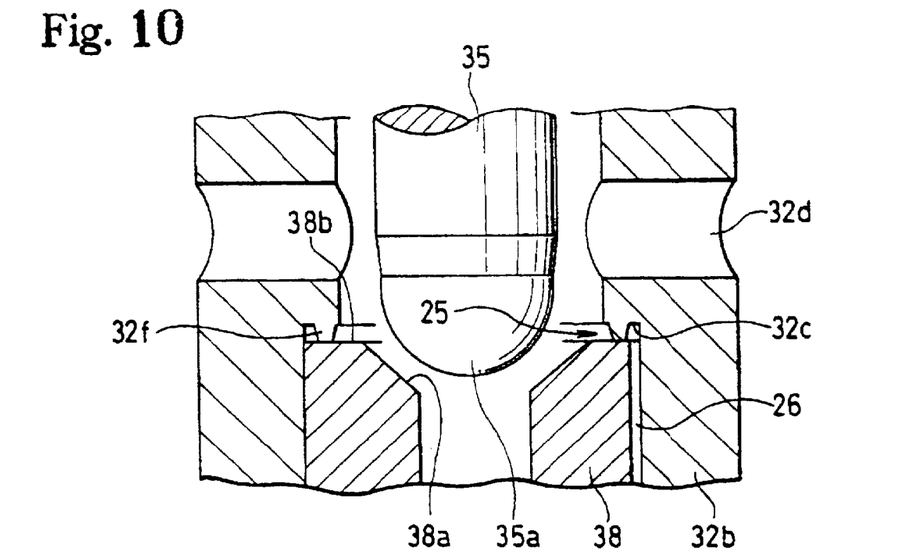
FIG. 10 is an enlarged view of the reverse stop valve relating to another embodiment of the present invention with a cylindrical protuberance formed at the stepped portion in the smaller diameter portion of the magnet core.

FIG. 9 and FIG. 10 each illustrate an embodiment with an improvement in the reverse stop valve mechanism for the release channel 26.

In FIG. 9, a cylindrical annular protuberance 38c is formed on the end surface 38b of the valve seat side of the inner piston 38. In FIG. 10, a cylindrical annular protuberance 32f is formed at the stepped portion 32c in the smaller diameter portion 32b of the magnet core.

In both diagrams, by abutting the cylindrical protuberance 38c or 32f against the stepped portion 32c in the diameter portion or the end surface 38b of the valve seat side, the reverse stop valve 25 of the release channel 26 may be formed to prevent the flow from the master cylinder side to the wheel side.

In these embodiments, when an obstacle such as a particle of dirt exists in the valve mechanism of the reverse stop valve 25, forming the cylindrical protuberance 38c or 32f facilitates removing it, thereby providing an effective contamination control.

This invention has the following effects:

The inner piston slides against the spring force of the inner spring when the inlet valve member reaches the inner piston forming the inlet valve seat. Therefore, metal and pulsation sound (NVH) created by the opening and closing operation of the inlet valve may be eliminated by the deflection of the spring to effectively prevent the NVH effect.

When the hydraulic pressure of the master cylinder becomes lower by forming the release channel between the smaller diameter portion of magnet core and the inner piston, a fluid of the wheel cylinder is certainly released through the release channel.

The throttle channel normally connecting between the main line of the master cylinder side and the first hydraulic chamber prevents malfunction of the switching valve when in a sudden braking.

The cylindrical protuberance can be formed on the end surface at the valve seat side of the inner piston or on the stepped portion in the smaller diameter portion of the magnet core to provide an effective anti-contamination effect on the reverse stop valve at the release channel.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What I claim is:

1. A normally open hydraulic control valve device which comprises:

a sleeve fixed in a bore of a housing, an armature which is slidably installed in said sleeve including a valve stem with a valve member on a distal end thereof, a magnet core fixed in the bore of the housing together with said sleeve, said magnet core having a smaller diameter portion extending into the bore, a coil assembly operating said armature by an electromagnetic force, a piston strokably provided in said smaller diameter portion of said magnet core, a valve seat formed on an end surface of said piston facing said valve member, said valve seat and said valve member defining the normally open control valve enabling flow through the piston when said coil assembly is not being operated by the electromagnetic force, and a spring provided between said piston and a bottom of the bore absorbing operation impact created when said valve member comes into contact with said valve seats when said coil assembly is being operated by the electromagnetic force.

2. A hydraulic control valve device as claimed in claim 1, wherein a release channel is formed at said piston.

3. A hydraulic control valve device as claimed in claim 1, wherein a release channel is formed between said piston and an inner surface of said smaller diameter portion of said magnet core.

4. A hydraulic control valve device which comprises a normally open inlet valve in a main hydraulic line between a master cylinder and a wheel cylinder and a hydraulic switching valve at a wheel cylinder side of said inlet valve in the main line, wherein said switching valve controls a channel between said master cylinder and wheel cylinder to be wide open when in a normal braking operation and a hydraulic pressure difference between said master cylinder side and wheel cylinder side switching the channel to be throttled when in a hydraulic control;

wherein said inlet valve comprises
  a sleeve fixed in a bore of a housing,
  an armature slidably installed in said sleeve including a valve stem with an inlet valve member at a distal end thereof,
  a magnet core fixed in the bore of the housing with the sleeve, through which said inlet valve member is inserted, said magnet core having a smaller diameter portion extending into the bore,
  a coil assembly electromagnetically operating said armature,
  an inner piston slidably provided in smaller diameter portion of the magnet core,
  an inlet valve seat formed on the surface of said inner piston facing said inlet valve member, and
  an inner spring provided between said inner piston and a bottom of the bore absorbing an impact created when closing the valve mechanism of said inlet valve member and inlet valve seat; and
wherein said switching valve comprises:
  an outer piston which is slidably provided exterior on said smaller diameter portion of the magnet core dividing said bore into a first hydraulic chamber connected to the master cylinder and a second hydraulic chamber connected to the wheel cylinder,
  an outer spring pressing said outer piston toward the bottom of the bore, and
  a connection bore provided through said smaller diameter portion of said magnet core to connect the master cylinder side and the wheel cylinder side and defining said channel, wherein
    said outer piston slides along said smaller diameter portion of said magnet core in response to the hydraulic pressure difference between said master cylinder side and wheel cylinder side as occurring in said first and second hydraulic chambers, respectively, in the direction to switch the channel from being wide open to being throttled.

5. A hydraulic control valve device as claimed in claim 4, wherein
  a release channel is formed at said piston;
  whereby hydraulic pressure of said wheel cylinder is released to said master cylinder via said release channel when the hydraulic pressure of said master cylinder falls below the predetermined amount from the hydraulic pressure of said wheel cylinder.

6. A hydraulic control valve device as claimed in claim 5, further comprising: a reverse stop valve formed to prevent a flow through said release channel, said stop valve including a cylindrical protuberance formed on a stepped portion in said smaller diameter portion of said magnet core facing the end surface of said valve seat side of the piston, flow through the release channel being stopped by said cylindrical protuberance and said stepped portion in the smaller diameter portion.

7. A hydraulic control, valve device as claimed in claim 6, further comprising:
  a retainer ring contacting the bottom of the bore and extending into the smaller diameter portion of said magnet core,
  wherein a throttle channel is formed between said retainer ring and said smaller diameter portion of the magnet core, and
  a main channel of the master cylinder side and the first hydraulic chamber are connected via said throttle channel.

8. A hydraulic control valve device as claimed in claim 5, further comprising:
  a retainer ring contacting the bottom of the bore and extending into the smaller diameter portion of said magnet core,
  wherein a throttle channel is formed between said retainer ring and said smaller diameter portion of the magnet core, and
  a main channel of the master cylinder side and the first hydraulic chamber are connected via said throttle channel.

9. A hydraulic control valve device as claimed in claim 8, further comprising: a holding plate formed on said retainer ring, and a sealing device inserted between an outer surface of said smaller diameter portion of the magnet core and the bore, said sealing member being held by said holding plate.

10. A hydraulic control valve device as claimed in claim 9, further comprising: a holding plate formed on said retainer ring, and a sealing device inserted between an outer surface of said smaller diameter portion of the magnet core and the bore, said sealing member being held by said holding plate.

11. A hydraulic control valve device as claimed in claim 5, further comprising: a reverse stop valve formed to prevent a flow through said release channel, said stop valve including a cylindrical protuberance formed on the end surface of the valve seat side of said piston, flow through the release channel being stopped by said cylindrical protuberance and the end surface of the valve seat side abutting against said cylindrical protuberance.

12. A hydraulic control valve device as claimed in claim 11, further comprising:
  a retainer ring contacting the bottom of the bore and extending into the smaller diameter portion of said magnet core,
  wherein a throttle channel is formed between said retainer ring and said smaller diameter portion of the magnet core, and
  a main channel of the master cylinder side and the first hydraulic chamber are connected via said throttle channel.

13. A hydraulic control valve device as claimed in claim 4, further comprising:
  a retainer ring contacting the bottom of the bore and extending into the smaller diameter portion of said magnet core,
  wherein a throttle channel is formed between said retainer ring and said smaller diameter portion of the magnet core, and
  a main channel of the master cylinder side and the first hydraulic chamber are connected via said throttle channel.

14. A hydraulic control valve device as claimed in claim 13, further comprising: a holding plate formed on said retainer ring, and a sealing device inserted between an outer surface of said smaller diameter portion of the magnet core and the bore, said sealing member being held by said holding plate.

15. A hydraulic control valve device as claimed in claim 4, wherein
  a release channel is formed between said piston and an inner surface of said smaller diameter portion of said magnet core;
  whereby hydraulic pressure of said wheel cylinder is released to said master cylinder via said release channel when the hydraulic pressure of said master cylinder falls below the predetermined amount from the hydraulic pressure of said wheel cylinder.

16. A hydraulic control valve device as claimed in claim 15, further comprising: a reverse stop valve formed to prevent a flow through said release channel, said stop valve including a cylindrical protuberance formed on the end surface of the valve seat side of said piston, flow through the release channel being stopped by said cylindrical protuberance and the end surface of the valve seat side abutting against said cylindrical protuberance.

17. A hydraulic control valve device as claimed in claim 16, further comprising:
   a retainer ring contacting the bottom of the bore and extending into the smaller diameter portion of said magnet core,
   wherein a throttle channel is formed between said retainer ring and said smaller diameter portion of the magnet core, and
   a main channel of the master cylinder side and the first hydraulic chamber are connected via said throttle channel.

18. A hydraulic control valve device as claimed in claim 15, further comprising:
   a retainer ring contacting the bottom of the bore and extending into the smaller diameter portion of said magnet core,
   wherein a throttle channel is formed between said retainer ring and said smaller diameter portion of the magnet core, and
   a main channel of the master cylinder side and the first hydraulic chamber are connected via said throttle channel.

19. A hydraulic control valve device as claimed in claims 18, further comprising: a holding plate formed on said retainer ring, and a sealing device inserted between an outer surface of said smaller diameter portion of the magnet core and the bore, said sealing member being held by said holding plate.

20. A hydraulic control valve device as claimed in claim 19, further comprising: a holding plate formed on said retainer ring, and a sealing device inserted between an outer surface of said smaller diameter portion of the magnet core and the bore, said sealing member being held by said holding plate.

21. A hydraulic control valve device as claimed in claim 15, further comprising: a reverse stop valve formed to prevent a flow through said release channel, said stop valve including a cylindrical protuberance formed on a stepped portion in said smaller diameter portion of said magnet core facing the end surface of said valve seat side of the piston, flow through the release channel being stopped by said cylindrical protuberance and said stepped portion in the smaller diameter portion.

22. A hydraulic control valve device as claimed in claim 15, further comprising: a reverse stop valve formed to prevent a flow through said release channel, said stop valve including a cylindrical protuberance formed on a stepped portion in said smaller diameter portion of said magnet core facing the end surface of said valve seat side of the piston, flow through the release channel being stopped by said cylindrical protuberance and the end surface of the valve seat side abutting against said stepped portion in the smaller diameter portion.

23. A hydraulic control valve device as claimed in claim 22, further comprising:
   a retainer ring contacting the bottom of the bore and extending into the smaller diameter portion of said magnet core,
   wherein a throttle channel is formed between said retainer ring and said smaller diameter portion of the magnet core, and
   a main channel of the master cylinder side and the first hydraulic chamber are connected via said throttle channel.

24. A hydraulic control valve device which comprises:
   a sleeve fixed in a bore of a housing,
   an armature which is slidably installed in said sleeve including a valve stem with a valve member on a distal end thereof,
   a magnet core fixed in the bore of the housing together with said sleeve, said magnet core having a smaller diameter portion extending into the bore,
   a coil assembly operating said armature by an electromagnetic force,
   a piston strokably provided in said smaller diameter portion of said magnet core,
   a valve seat formed on an end surface of said piston facing said valve member,
   a spring provided between said piston and a bottom of the bore absorbing operation impact created when said valve member comes into contact with said valve seat, wherein a release channel is formed at said piston, and
   a reverse stop valve formed to prevent a flow through said release channel, said stop valve including a cylindrical protuberance formed on the end surface of the valve seat side of said piston.

25. A hydraulic control valve device which comprises:
   a sleeve fixed in a bore of a housing,
   an armature which is slidably installed in said sleeve including a valve stem with a valve member on a distal end thereof,
   a magnet core fixed in the bore of the housing together with said sleeve, said magnet core having a smaller diameter portion extending into the bore,
   a coil assembly operating said armature by an electromagnetic force,
   a piston strokably provided in said smaller diameter portion of said magnet core,
   a valve seat formed on an end surface of said piston facing said valve member,
   a spring provided between said piston and a bottom of the bore absorbing operation impact created when said valve member comes into contact with said valve seat, wherein a release channel is formed at said piston, and
   a reverse stop valve formed to prevent a flow through said release channel, said stop valve including a cylindrical protuberance formed on a stepped portion in said smaller diameter portion of said magnet core facing the end surface of said valve seat side of the piston, flow through the release channel being stopped by said cylindrical protuberance and the end surface of the valve seat side abutting against said stepped portion in the smaller diameter portion.

26. A hydraulic control valve device which comprises:
   a sleeve fixed in a bore of a housing,
   an armature which is slidably installed in said sleeve including a valve stem with a valve member on a distal end thereof, a magnet core fixed in the bore of the housing together with said sleeve, said magnet core having a smaller diameter portion extending into the bore, a coil assembly operating said armature by an electromagnetic force, a piston strokably provided in said smaller diameter portion of said magnet core, a valve seat formed on an end surface of said piston facing said valve member, a spring provided between said piston and a bottom of the bore absorbing operation impact created when said valve member comes into contact with said valve seat, wherein a release channel is formed between said piston and an inner surface of said smaller diameter portion of said magnet core, and a reverse stop valve formed to prevent a flow through said release channel, said stop valve including a cylindrical protuberance formed on the end surface of the valve seat side of said piston, flow through the release channel being stopped by said cylindrical protuberance and the end surface of the valve seat side abutting against said cylindrical protuberance.

27. A hydraulic control valve device which comprises:

a sleeve fixed in a bore of a housing, an armature which is slidably installed in said sleeve including a valve stem with a valve member on a distal end thereof, a magnet core fixed in the bore of the housing together with said sleeve, said magnet core having a smaller diameter portion extending into the bore, a coil assembly operating said armature by an electromagnetic force, a piston strokably provided in said smaller diameter portion of said magnet core, a valve seat formed on an end surface of said piston facing said valve member, a spring provided between said piston and a bottom of the bore absorbing operation impact created when said valve member comes into contact with said valve seat, wherein a release channel is formed between said piston and an inner surface of said smaller diameter portion of said magnet core, and a reverse stop valve formed to prevent a flow through said release channel, said stop valve including a cylindrical protuberance formed on a stepped portion in said smaller diameter portion of said magnet core facing the end surface of said valve seat side of the piston, flow through the release channel being stopped by said cylindrical protuberance and the end surface of the valve seat side abutting against said stepped portion in the smaller diameter portion.

* * * * *